United States Patent
Oda

(10) Patent No.: US 6,667,470 B2
(45) Date of Patent: Dec. 23, 2003

(54) SOLID-STATE ELECTRONIC IMAGE SENSING DEVICE AND METHOD OF CONTROLLING OPERATION OF SAME

(75) Inventor: Kazuya Oda, Asaka (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 0 days.

(21) Appl. No.: 10/171,533

(22) Filed: Jun. 17, 2002

(65) Prior Publication Data
US 2002/0195543 A1 Dec. 26, 2002

(30) Foreign Application Priority Data
Jun. 20, 2001 (JP) .......................... 2001-185740

(51) Int. Cl.[7] .............................................. H01L 27/00
(52) U.S. Cl. ..................... 250/208.1; 250/226; 348/248
(58) Field of Search ............................ 250/208.1, 226, 250/214 R; 257/291, 440; 348/220.1, 221.1, 222.1, 230.1, 248, 272, 273, 294, 297–299, 319; 386/117, 120

(56) References Cited

U.S. PATENT DOCUMENTS 6,222,986 B1 * 4/2001 Inuiya ........................ 386/117

* cited by examiner

*Primary Examiner*—Que T. Le
(74) *Attorney, Agent, or Firm*—McGinn & Gibb, PLLC

(57) ABSTRACT

A sweep-out drain is provided in parallel with a horizontal transfer line via a drain gate. When vertical one-half down-sampling is performed, signal charge that has accumulated in the photodiodes of (4m+3)th and (4m+4)th rows is shifted to vertical transfer lines and is output from the horizontal transfer line as a video signal. Signal charge that has accumulated in the photodiodes of (4m+1)th and (4m+2)th rows is not shifted to the vertical transfer lines. If signal charge (smear charge) that has accumulated in the photodiodes of the (4m+1)th and (4m+2)th rows leaks into the vertical transfer lines owing to a brightly illuminated subject, the smear charge is swept out from the sweep-out drain via the drain gate. A video signal from which smear charge has been eliminated is obtained.

7 Claims, 12 Drawing Sheets

TIME t31

TIME t32

TIME t33

TIME t34

TIME t35

TIME t36

TIME t37

TIME t38

SOLID-STATE ELECTRONIC IMAGE SENSING DEVICE AND METHOD OF CONTROLLING OPERATION OF SAME

BACKGROUND OF THE INVENTION

1. Field of the Invention

This invention relates to a solid-state electronic image sensing device, an image sensing apparatus and methods of controlling operation of the device and apparatus.

2. Description of the Related Art

A solid-state electronic image sensor such as a CCD is utilized as the image sensor in a digital still camera. An increase in the number of pixels used in solid-state electronic image sensors has been accompanied by the need for a longer period of time to obtain output of a video signal from the image sensor.

In a digital still camera, angle-of-view adjustments and the like can be made so long as the subject can be checked in general. This means that a video signal corresponding to all pixels capable of being output by the solid-state electronic image sensor is not necessarily required. For this reason, there are instances where line downsampling is performed in such a manner that only one row (line) of a video signal is output for every plurality of rows in the vertical direction of the solid-state electronic image sensor. Since this approache reduces the amount of video signal output from the solid-state electronic image sensor, output of the video signal ends in a short period of time.

At certain times, such as when the subject is brightly illuminated, signal charge that has accumulated in photodiodes of a solid-state electronic image sensor leaks into adjacent photodiodes or into the vertical transfer lines, etc., as a result of which a phenomenon referred to as smear occurs. Even if line downsampling is performed, unnecessary signal charge that has leaked from the photodiodes of a row to be downsampled leaks into the vertical transfer lines and is superimposed upon the video signal to be output. This causes a decline in image quality.

In general, color filters are formed on the photodiodes of a solid-state electronic image sensor so that an RGB color video signal can be output. The RGB color video signal output from the solid-state electronic image sensor is separated color by color to produce luminance data and color difference data, etc. It is preferred, therefore, that a video signal that has already been separated into its individual colors be output at the moment an output is produced by the solid-state electronic image sensor.

DISCLOSURE OF THE INVENTION

Accordingly, an object of the present invention is to prevent a decline in image quality due to smear even if line downsampling is performed.

Another object of the present invention is to utilize unnecessary signal charge effectively.

A further object of the present invention is to so arrange it that a solid-state electronic image sensor can output a video signal that has been separated color by color.

According to a first aspect of the present invention, the foregoing objects are attained by providing a solid-state electronic image sensing device comprising: a number of photoelectric transducers arrayed in vertical and horizontal directions; vertical transfer lines, on which vertical transfer electrodes are formed in correspondence with the photoelectric transducers, for transferring signal charge, which has accumulated in the photoelectric transducers, in the vertical direction by application of vertical transfer pulses to the vertical transfer electrodes; a horizontal transfer line for transferring in the horizontal direction and outputting signal charge that has been transferred from the vertical transfer lines; a charge sweep-out drain for sweeping out signal charge input thereto; and a controller which, when vertical downsampling readout is performed, is for controlling the vertical transfer lines and the horizontal transfer line in such a manner that of signal charge that has accumulated in a plurality of rows of the photoelectric transducers, signal charge that has accumulated in at least one row of these photoelectric transducers is output from the horizontal transfer line, and controlling the vertical transfer lines and the horizontal transfer line in such a manner that smear charge, which is produced in vertical transfer lines between the vertical transfer electrodes corresponding to the photoelectric transducers of the one row, is applied to the charge sweep-out drain and is swept out from the charge sweep-out drain.

The first aspect of the present invention also provides a control method suited to the above-described solid-state electronic image sensing device. Specifically, there is provided a method of controlling a solid-state electronic image sensing device having a number of photoelectric transducers arrayed in vertical and horizontal directions; vertical transfer lines, on which vertical transfer electrodes are formed in correspondence with said photoelectric transducers, for transferring signal charge, which has accumulated in said photoelectric transducers, in the vertical direction by application of vertical transfer pulses to the vertical transfer electrodes, and a horizontal transfer line for transferring in the horizontal direction and outputting signal charge that has been transferred from the vertical transfer lines; the method comprising the steps of: providing a charge sweep-out drain for sweeping out signal charge input thereto; and when vertical downsampling readout is performed, controlling the vertical transfer lines and the horizontal transfer line in such a manner that of signal charge that has accumulated in a plurality of rows of the photoelectric transducers, signal charge that has accumulated in at least one row of these photoelectric transducers is output from the horizontal transfer line, and controlling the vertical transfer lines and the horizontal transfer line in such a manner that smear charge, which is produced in vertical transfer lines between the vertical transfer electrodes corresponding to the photoelectric transducer of the one row, is applied to the charge sweep-out drain and is swept out from the charge sweep-out drain.

In accordance with the first aspect of the present invention, the charge sweep-out drain is provided.

When vertical downsampling readout is performed, signal charge, which has accumulated in at least one row of photoelectric transducers, of signal charge accumulated in photoelectric transducers of a plurality of rows is output from the horizontal transfer line as a video signal. Smear charge, which is produced in vertical transfer lines between the vertical transfer electrodes corresponding to the photoelectric transducers of the one row, is swept out from the charge sweep-out drain.

Thus, smear charge is swept out from the sweep-out drain and does not become superimposed on the video signal that is output from the horizontal transfer lines. This makes it possible to prevent a decline in image quality caused by superposition of smear charge on the video signal.

The control unit may be so adapted that when vertical downsampling readout is performed, the control unit controls the vertical transfer lines and the horizontal transfer line in such a manner that of signal charge that has accumulated in three or more rows of the photoelectric transducers, signal charge that has accumulated in at least one row of these photoelectric transducers is output from the horizontal transfer line, and controls the vertical transfer lines and the horizontal transfer line in such a manner that smear charge of a plurality of rows, which is produced in vertical transfer lines between the vertical transfer electrodes corresponding to the photoelectric transducers of the one row, is accumulated temporarily in the horizontal transfer line and the accumulated smear charge of the plurality of rows is swept out from the charge sweep-out drain.

Thus, smear charge of a plurality of rows can be accumulated temporarily in the charge sweep-out drain and then this charge can be swept out collectively thereafter.

According to a second aspect of the present invention, the foregoing objects are attained by providing an image sensing apparatus comprising: an image sensing device for sensing the image of a subject, and outputting a video signal representing the image of the subject, using a solid-state electronic image sensing device having vertical transfer lines on which vertical transfer electrodes are formed in correspondence with a number of photoelectric transducers arrayed in vertical and horizontal directions, a horizontal transfer line for transferring in the horizontal direction and outputting signal charge that has been transferred from the vertical transfer lines, a charge sweep-out drain for sweeping out signal charge input thereto, and a device which, when vertical downsampling readout is performed, is for controlling the vertical transfer lines and the horizontal transfer line in such a manner that signal charge that has accumulated in at least one row of the photoelectric transducers among a plurality of rows thereof is output from the horizontal transfer line as a video signal, and in such a manner that signal charge that has accumulated in the photoelectric transducers of the one row is applied to the charge sweep-out drain and is swept out from the charge sweep-out drain; an exposure controller for controlling exposure of the photoelectric transducers of the solid-state electronic image sensing device in accordance with an applied exposure control signal; and an exposure-amount calculator for calculating amount of exposure based upon signal charge that has been swept out from the charge sweep-out drain, generating the exposure control signal in such a manner that the amount of exposure becomes the calculated amount of exposure, and applying the exposure control signal to the exposure controller.

The second aspect of the present invention also provides a control method suited to the above-described image sensing apparatus. Specifically, there is provided a method of controlling an image sensing apparatus comprising the steps of: obtaining a video signal representing the image of a subject by sensing the image of the subject using a solid-state electronic image sensing device having vertical transfer lines on which vertical transfer electrodes are formed in correspondence with a number of photoelectric transducers arrayed in vertical and horizontal directions, a horizontal transfer line for transferring in the horizontal direction and outputting signal charge that has been transferred from the vertical transfer lines, a charge sweep-out drain for sweeping out signal charge input thereto, and a device which, when vertical downsampling readout is performed, is for controlling the vertical transfer lines and the horizontal transfer line in such a manner that signal charge that has accumulated in at least one row of the photoelectric transducers among a plurality of rows thereof is output from the horizontal transfer line as a video signal, and in such a manner that signal charge that has accumulated in the photoelectric transducers of the one row is applied to the charge sweep-out drain and is swept out from the charge sweep-out drain; calculating amount of exposure based upon signal charge that has been swept out from the charge sweep-out drain; and controlling exposure of the photoelectric transducers in such a manner that the amount of exposure becomes the calculated amount of exposure.

In accordance with the second aspect of the present invention, amount of exposure is calculated using signal charge that has accumulated in the photoelectric transducers of a line to be downsampled, and exposure control is then executed. The signal charge is swept out independently of the video signal output from the horizontal transfer line. As a result, exposure control can be executed using signal charge while the image represented by the video signal output from the horizontal transfer line is displayed.

According to a third aspect of the present invention, the foregoing objects are attained by providing a solid-state electronic image sensing device comprising: a number of photoelectric transducers arrayed in vertical and horizontal directions; a color filter formed on each of the photoelectric transducers and having a characteristic that allows transmission of a red, blue or green color component; vertical transfer lines for transferring signal charge, which has accumulated in the photoelectric transducers, in the vertical direction; a horizontal transfer line for temporarily accumulating signal charge that has been transferred from the vertical transfer lines, and transferring the signal charge in the horizontal direction; a charge sweep-out drain for sweeping out signal charge input thereto; and a transfer gate for transferring the signal charge, which has accumulated temporarily in the horizontal transfer line, from the horizontal transfer line to the charge sweep-out drain on a per-red-color-, blue-color- or green-color-component basis.

The third aspect of the present invention also provides a control method suited to the above-described solid-state electronic image sensing device. Specifically, there is provided a method of controlling a solid-state electronic image sensing device having a number of photoelectric transducers arrayed in vertical and horizontal directions, a color filter formed on each of the photoelectric transducers and having a characteristic that allows transmission of a red, blue or green color component, vertical transfer lines for transferring signal charge, which has accumulated in the photoelectric transducers, in the vertical direction, and a horizontal transfer line for temporarily accumulating signal charge that has been transferred from the vertical transfer lines, and transferring the signal charge in the horizontal direction, the method comprising the steps of: providing a charge sweep-out drain for sweeping out signal charge input thereto; and transferring the signal charge, which has accumulated temporarily in the horizontal transfer line, from the horizontal transfer line to the charge sweep-out drain on a per-red-color-, blue-color- or green-color-component basis.

In accordance with the third aspect of the present invention, the charge sweep-out drain is provided. Signal charge is accumulated temporarily in the horizontal transfer line. Of the temporarily accumulated signal charge, charge is transferred from the horizontal transfer line to the charge sweep-out drain on a per-red-color-, blue-color- or green-color-component basis. Signal charge of each of a red, blue or green color component is transferred from the charge sweep-out drain and output.

Thus, signal charge of each of a red, blue or green color component is obtained.

DESCRIPTION OF THE PREFERRED EMBODIMENTS

Preferred embodiments of the present invention will now be described in detail with reference to the accompanying drawings.

Figure 1:
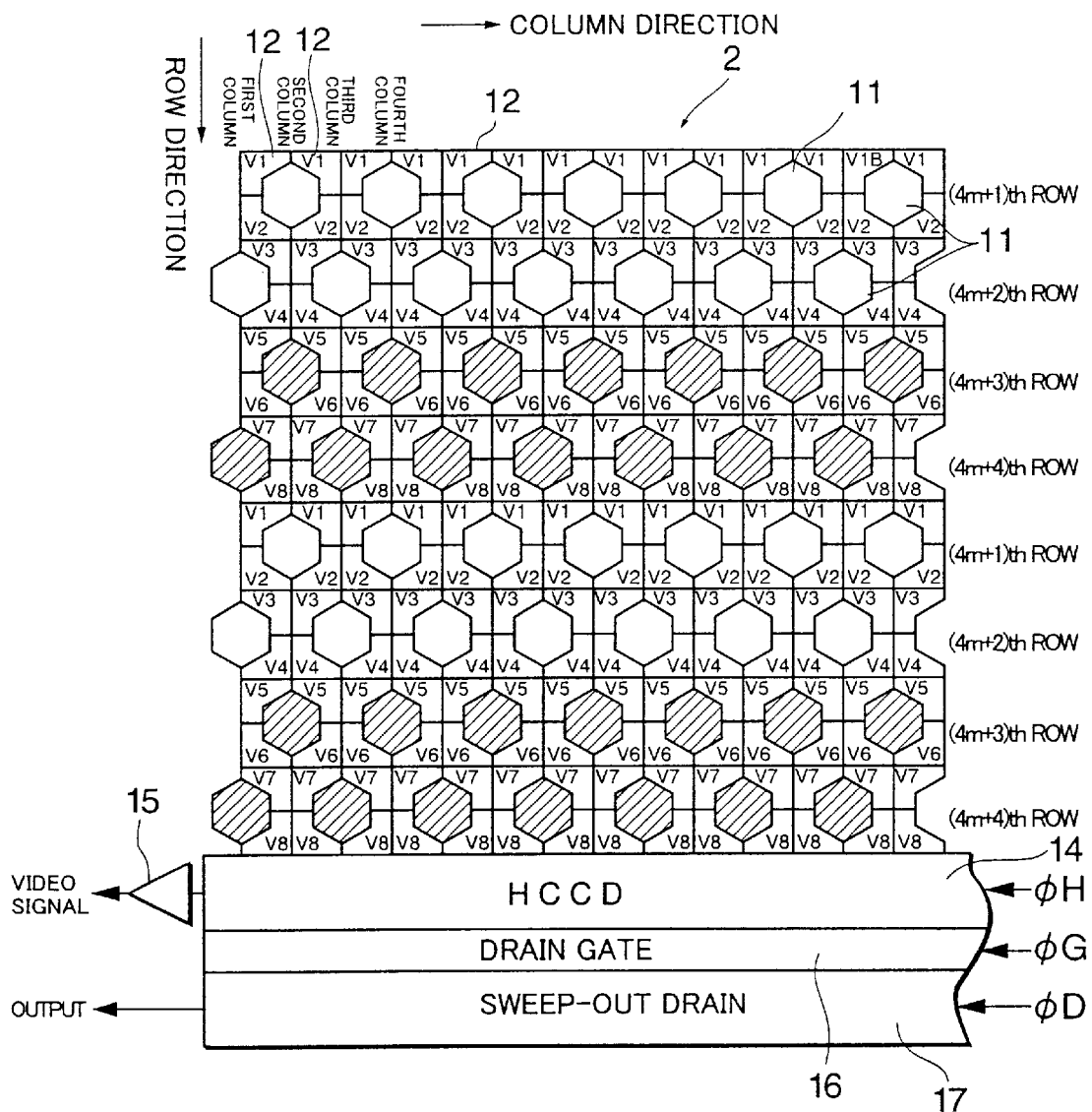
FIG. 1 is a diagram showing part of the structure of the photoreceptor surface of a CCD according to a first embodiment of the present invention.

FIG. 1 is a diagram showing part of the structure of the photoreceptor surface of a CCD 2 according to a first embodiment of the present invention.

As shown in FIG. 1, the CCD 2 has a number of photodiodes 11 arrayed in a number of columns and in a number of rows. The photodiodes 11 in odd-numbered columns are arrayed in even-numbered rows and those in even-numbered columns are arrayed in odd-numbered rows. Of course, an arrangement may be adopted in which the photodiodes 11 in odd-numbered columns are arrayed in odd-numbered rows and those in even-numbered columns are arrayed in even-numbered rows. The photoreceptor area of each photodiode 11 is hexagonal when viewed from the plane.

A vertical transfer line 12 is formed on the right side (or on the left side) of each column of the photodiodes 11. Vertical transfer electrodes V1 and V2 are provided on the right side of the photodiodes 11 of a (4m+1)th row (where m is a natural number or 0); vertical transfer electrodes V3 and V4 are provided on the right side of the photodiodes 11 of a (4m+2)th row; vertical transfer electrodes V5 and V6 are provided on the right side of the photodiodes 11 of a (4m+3)th row; and vertical transfer electrodes V7 and V8 are provided on the right side of the photodiodes 11 of a (4m+4)th row. Signal charge that has accumulated in the photodiodes 11 of two rows is made one row's worth of signal charge on a horizontal transfer line 14. Accordingly, two of the above-mentioned rows of photodiodes 11 is essentially equivalent to one row of photodiodes.

Thus, the vertical transfer electrodes V1 to V8 form one set every four rows from (4m+1)th to (4m+4)th rows, and they are formed on each vertical transfer line 12 repeatedly set by set. By applying vertical transfer pulses $\phi V1$ to $\phi V8$ to corresponding ones of the vertical transfer electrodes V1 to V8, the signal charge that has accumulated in the photodiodes 11 is transferred through the vertical transfer lines 12 in the row (vertical) direction.

Formed between each photodiode 1 and adjacent vertical transfer line 12 is a transfer gate (not shown), which is for shifting the signal charge that has accumulated in the photodiode 11 to the vertical transfer line 12. Signal charge that has accumulated in the photodiode 11 is shifted to the vertical transfer line 12 by applying a transfer-gate pulse to this transfer gate.

The horizontal transfer line 14, which is for transferring signal charge in the column (horizontal) direction in response to a horizontal transfer pulse $\phi H$ applied thereto, is provided at the lower end of the CCD 2. When signal charge that has been transferred through the vertical transfer lines 12 is applied to the horizontal transfer line 14, the signal charge is transferred in the horizontal direction and is output to the exterior as a video signal via an amplifier circuit 15.

In the CCD 2 according to this embodiment, a charge sweep-out drain 17 for sweeping out signal charge is provided in parallel with the horizontal transfer line 14. Further, a drain gate 16 for transferring signal charge, which has accumulated temporarily in the horizontal transfer line 14, to the sweep-out drain 17 is provided between the horizontal transfer line 14 and the sweep-out drain 17. By applying a drain-gate pulse $\phi G$ to the drain gate 16, all or some of the signal charge that has accumulated temporarily in the horizontal transfer line 14 is transferred to the sweep-out drain 17.

The CCD 2 according to this embodiment is capable of line downsampling readout, in which signal charge that has accumulated in at least one row of photodiodes 11 of a plurality of rows is read out. In a case described below, signal charge that has accumulated in (4m+3)th and (4m+4)th rows (indicated by hatching) is read out (this is referred to as vertical one-half down sampling readout). In vertical one-half downsampling readout, signal charge that has accumulated in the photodiodes 11 of (4m+1)th and (4m+2)th rows is not read out.

When the CCD 2 is exposed to light, the photodiodes 11 accumulate signal charge. Transfer-gate pulses are applied to the transfer gates that correspond to the photodiodes 11 of the (4m+3)th and (4m+4)th rows, as a result of which the accumulated signal charge is shifted to the vertical transfer lines 12. Transfer-gate pulses are not applied to the transfer gates that correspond to the photodiodes 11 of the (4m+1)th and (4m+2)th rows and therefore the accumulated signal charge of these photodiodes is not shifted to the vertical transfer lines 12.

When the amount of light received by the photodiodes 11 is great, however, there are instances where the signal charge that has accumulated in the photodiodes 11 of the (4m+1)th and (4m+2)th rows leaks into the vertical transfer lines 12. As a result, smear occurs in the image represented by the video signal that is output from the CCD 2. The signal charge that causes smear (this charge shall be referred to as "smear charge") accumulates in the portions below the vertical transfer electrodes V2 and V4 that correspond to the photodiodes 11 of the (4m+1)th and (4m+2)th rows.

In the CCD 2 according to this embodiment, smear charge that has leaked into the vertical transfer lines 12 from the photodiodes 11 of the downsampled (4m+1)th and (4m+2)th rows is swept out from the sweep-out drain 17.

Figure 2:
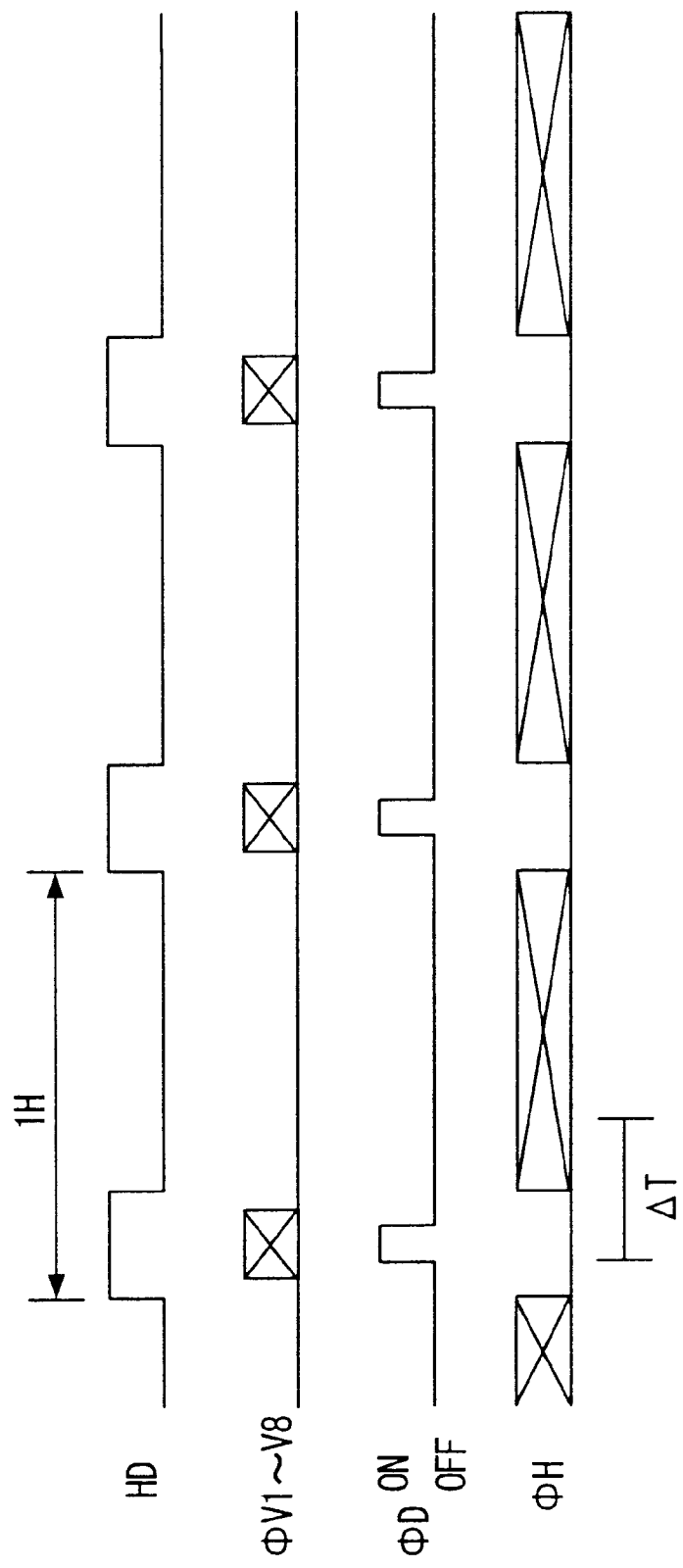
FIG. 2 is a time chart illustrating the operation of the CCD.
Figure 3:
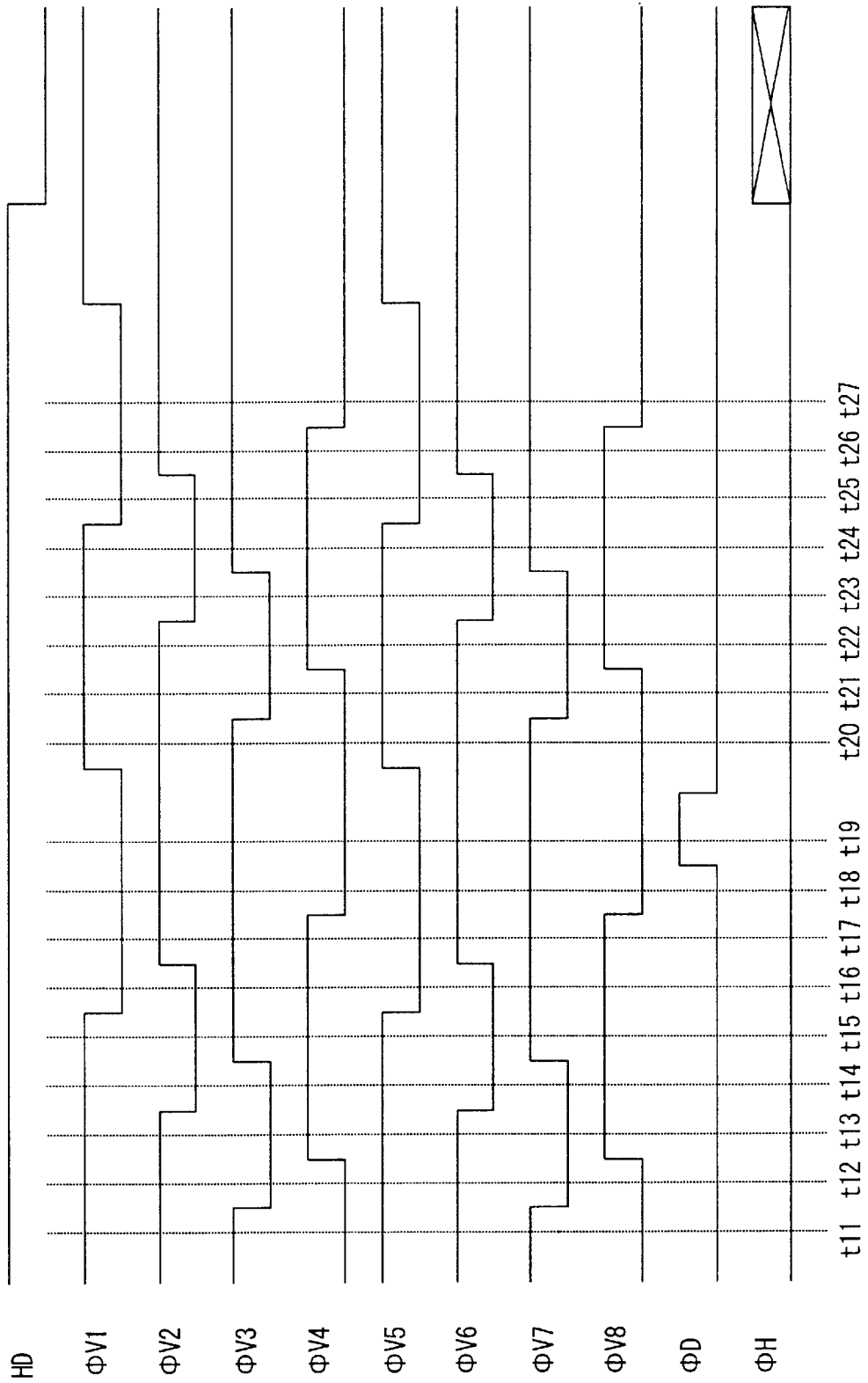
FIG. 3 is a diagram illustrating an enlargement of part of the time chart shown in FIG. 2.

FIG. 2 is a time chart for when signal charge is read out of the CCD 2 according to vertical one-half downsampling readout, FIG. 3 is a time chart illustrating an enlargement of an interval ΔT in FIG. 2, and FIGS. 4 to 6 are potential profiles illustrating the manner in which signal charge is transferred. The transfer of signal charge is carried out in the horizontal blanking interval of one horizontal scanning interval (1H).

Figure 4:
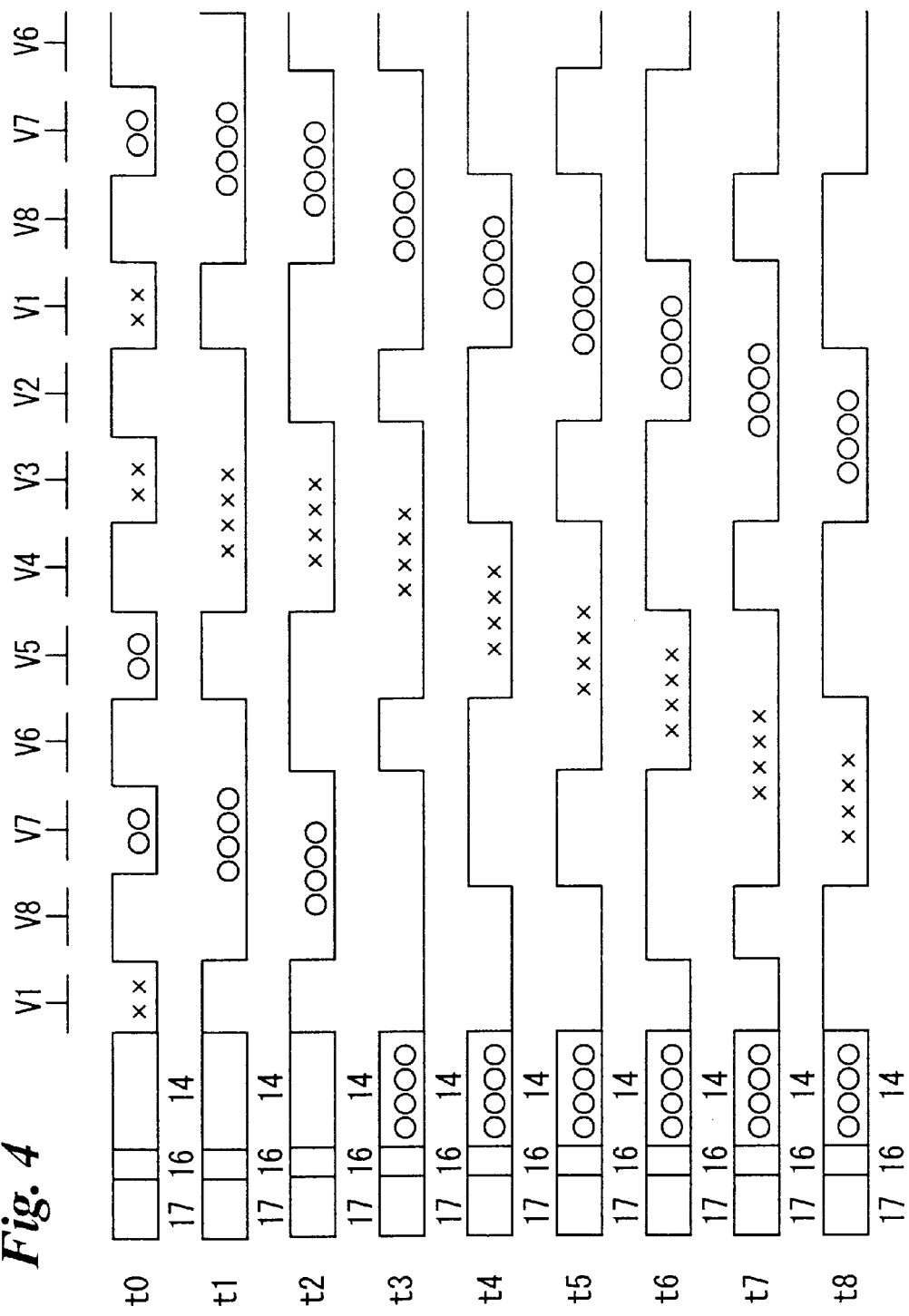
FIGS. 4 to 6 are potential profiles illustrating the manner in which signal charge is transferred.
Figure 5:
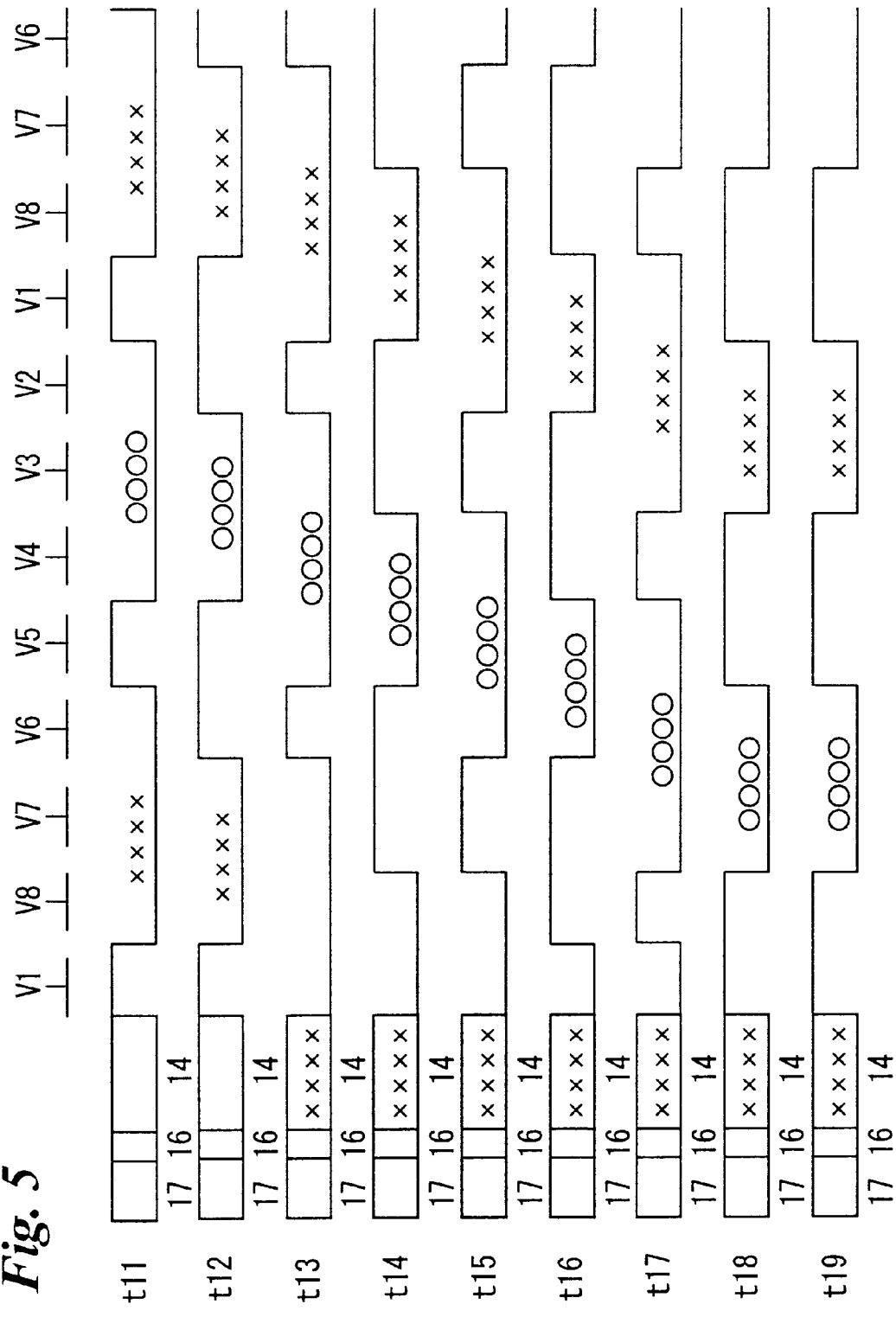

First, a case where signal charge that has accumulated in the photodiodes 11 of (4m+3)th and (4m+4)th rows is transferred to the horizontal transfer line 14 will be described mainly with reference to FIG. 4. The times from a time t0 to a time t8 (FIG. 4) described next are times within the horizontal blanking interval and precede a time t11 (FIG. 3).

At time t0, transfer-gate pulses are applied to the transfer gates corresponding to the photodiodes 11 of the (4m+3)th and (4m+4)th rows. When this is done, the signal charge that has accumulated in the photodiodes 11 of the (4m+3)th and (4m+4)th rows is transferred to the vertical transfer lines 12 and accumulates temporarily in the portions below the vertical transfer electrodes V6 and V8. Further, when the illuminance of a subject imaged by the CCD 2 is high, signal charge that has accumulated in the photodiodes 11 of the (4m+1)th and (4m+2)th rows leaks from the photodiodes 11 and accumulates temporarily in the portions below the vertical transfer electrodes V2 and V4. In the description rendered below, signal charge to be output from the horizontal transfer line 14 as a video signal shall be referred to as "video signal charge" (indicated by the "○" symbol), and signal charge to be swept out from the sweep-out drain 17 shall be referred to as "smear charge" (indicated by the "x" symbol).

At time t1, vertical transfer pulses φV6, φV7 and φV8 are applied to the vertical transfer electrodes V6, V7 and V8, respectively, and potential wells form in the portions below the vertical transfer electrodes V6, V7 and V8. Video signal charge accumulates in the potential wells formed. Further, vertical transfer pulses φV2, φV3 and φV4 (H-level pulses) are applied to the vertical transfer electrodes V2, V3 and V4, respectively, and potential wells form in the portions below the vertical transfer electrodes V2, V3 and V4. Smear charge accumulates in the potential wells formed.

The vertical transfer pulses φV2 and φV6 fall to the L level at time t2 and the vertical transfer pulses φV1 and φV5 rise to the H level at time t3, whereupon the video signal charge that accumulated in the photodiodes 11 of the (4m+3)th and (4m+4)th rows nearest to the horizontal transfer line 14 is input to the horizontal transfer line 14.

The vertical transfer pulses φV3 and φV7 fall to the L level at time t4 and the vertical transfer pulses φV2 and φV6 rise to the H level at time t5. The vertical transfer pulses φV4 and φV8 fall to the L level at time t6 and the vertical transfer pulses φV3 and φV7 rise to the H level at time t7. Furthermore, the vertical transfer pulses φV1 and φV5 fall to the L level at time t8.

A horizontal transfer pulse φH is applied to the horizontal transfer line 14 under the conditions prevailing at time t8, whereupon signal charge that has accumulated in the photodiodes 11 of the (4m+3)th and (4m+4)th rows is output from the horizontal transfer line 14 as a video signal.

The vertical transfer pulses φV4 and φV8 rise to the H level at time t11 and the vertical transfer pulses φV2 and φV6 fall to the L level at time t12. When the vertical transfer pulses φV1 and φV5 rise to the H level at time t13, smear charge is transferred to the horizontal transfer line 14.

Furthermore, the vertical transfer pulses φV3 and φV7 fall to the L level at time t14. The vertical transfer pulses φV2 and φV6 rise to the H level at time t15, and the vertical transfer pulses φV4 and φV8 fall to the L level at time t16. The vertical transfer pulses φV3 and φV7 rise to the H level at time t17 and the vertical transfer pulses φV1 and φV5 fall to the L level at time t18.

When a drain-gate pulse φG is applied to the drain gate 16 at time t19, smear charge that has leaked from the photodiodes 11 of the (4m+1)th and (4m+2)th rows nearest to the horizontal transfer line 14 is input to the sweep-out drain 17. When a drain pulse φD is applied to the sweep-out drain 17, the smear charge that has entered the sweep-out drain 17 is swept out.

Figure 6:
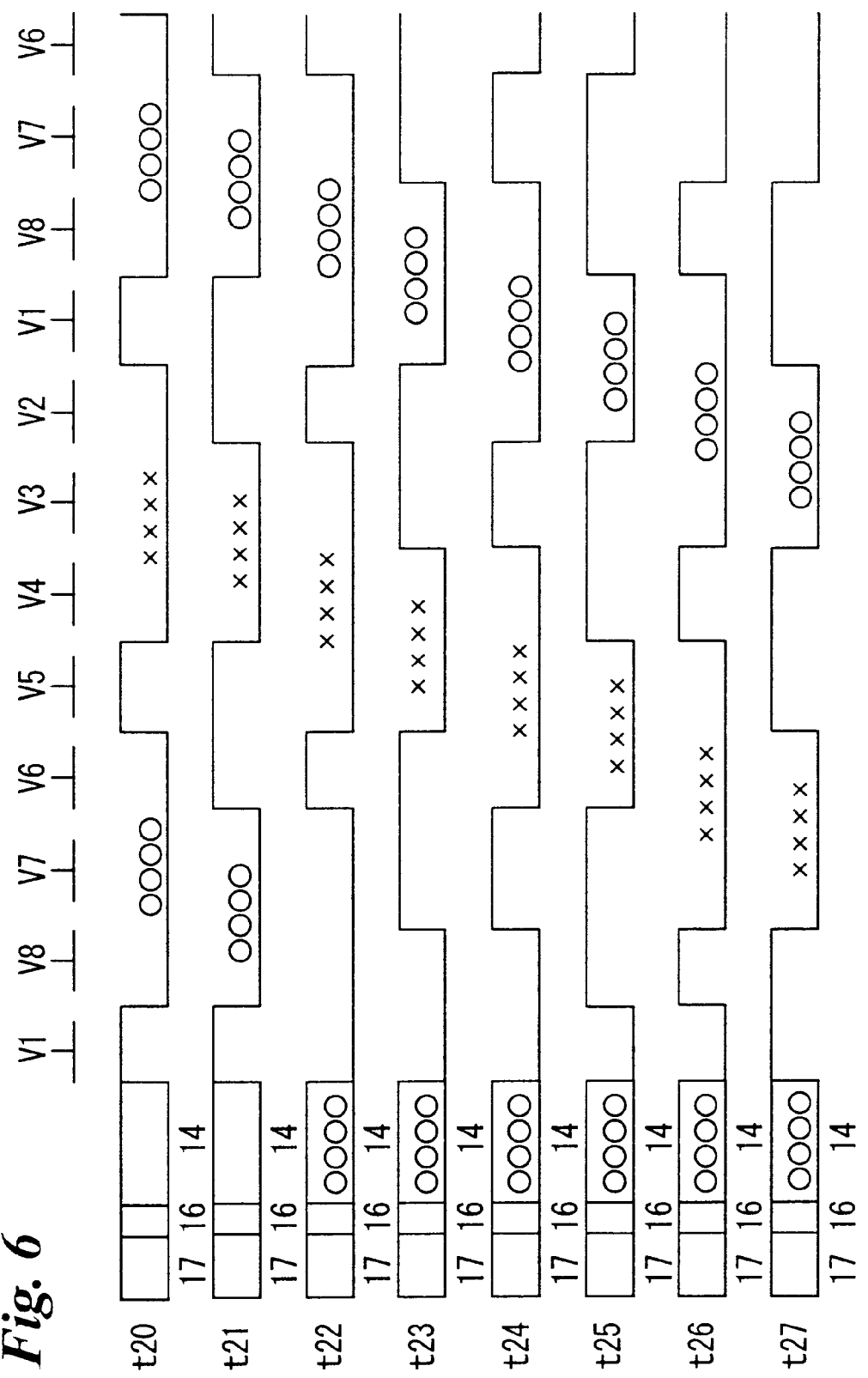

With reference now mainly to FIG. 6, the vertical transfer pulses φV4 and φV8 rise to the H level at time t20 and the vertical transfer pulses φV2 and φV6 fall to the L level at time t21. When the vertical transfer pulses φV1 and φV5 rise to the H level at time t22, the signal charge that accumulated in the photodiodes 11 of the (4m+3)th and (4m+4)th rows is input to the horizontal transfer line 14 again.

Thereafter, from times t23 to t27, vertical transfer pulses φV1 to φV8 identical with the vertical transfer pulses at times t4 to t8 described above are applied so that video signal charge and smear charge are transferred in the vertical direction.

At time t27, the video signal charge is transferred in the horizontal direction from the horizontal transfer line 14 and is output as a video signal.

The processing steps executed at times t11 to t27 are repeated in the horizontal blanking interval so that signal charge that has accumulated in the photodiodes 11 of all of the (4m+3)th and (4m+4)th rows of CCD 2 is output from the horizontal transfer line 14 as a video signal whereas smear charge that has leaked from the photodiodes 11 of the (4m+1)th and (4m+2)th rows is output from the sweep-out drain 17.

The video signal that is output from the horizontal transfer line 14 is devoid of smear charge that leaked into the vertical transfer lines 12 from the photodiodes 11 of downsampled lines. Accordingly, smear is eliminated from the image represented by the video signal output from the horizontal transfer line 14.

In the embodiment described above, the smear charge is swept out from the sweep-out drain 17. However, it can readily be understood that signal charge that has accumulated in the photodiodes 11 of lines to be downsampled (signal charge that has accumulated in the photodiodes 11 of the (4m+1)th and (4m+2)th rows) also can be swept out from the sweep-out drain 17. In other words, it will suffice to apply transfer-gate pulses also to the transfer gates that correspond to the photodiodes 11 of lines to be downsampled, transfer vertically the signal charge that has shifted into the vertical transfer lines 12 and apply this signal charge to the sweep-out drain 17.

Rather than using the vertical one-half downsampling described above, an arrangement may be adopted in which, of signal charge that has accumulated in the photodiodes 11 of three or more rows, signal charge that has accumulated in the photodiodes 11 of one row is output as a video signal from the vertical transfer line 12. In such case, a plurality of rows of smear charge that has leaked into the vertical transfer lines 12 from the photodiodes 11 of rows to be downsampled accumulates temporarily in the vertical transfer lines 12, after which this smear charge of plural rows can be swept out from the sweep-out drain 17.

Figure 7:
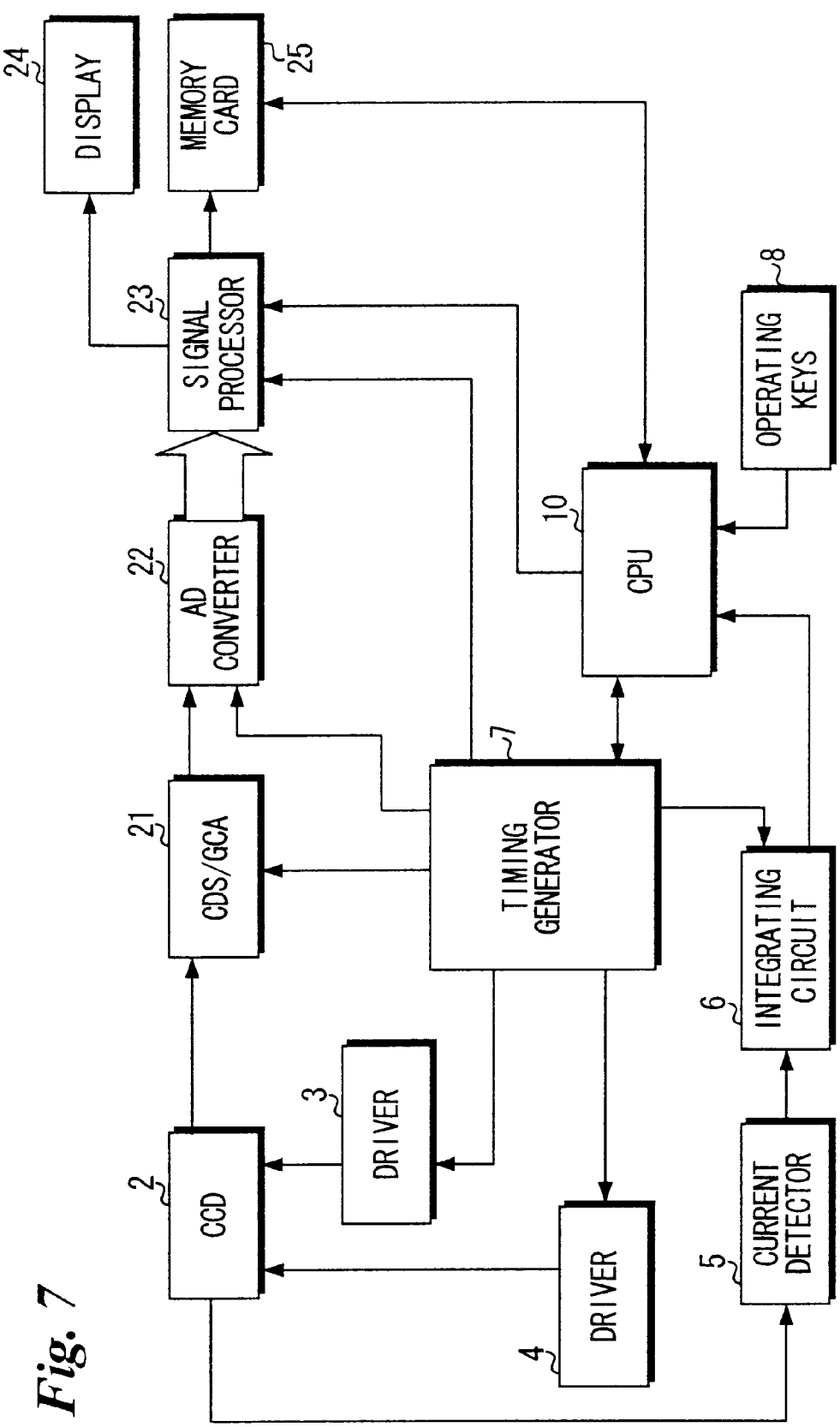
FIG. 7 is a block diagram illustrating the electrical structure of a digital still camera.

FIG. 7 is a block diagram illustrating the electrical structure of a digital still camera in which the CCD 2 shown in FIG. 1 is used as the image sensing device.

The overall operation of the digital still camera is controlled by a CPU 10.

The digital still camera is provided with various operating keys 8 that includes a mode setting button and a shutter-release button, etc. Setting signals from the operating keys 8 are input to the CPU 10.

The digital still camera includes a timing pulse generating circuit 7 for generating various timing pulses. Clock pulses generated by the timing pulse generating circuit 7 are applied to drivers 3 and 4. The driver 3 generates the above-mentioned transfer-gate pulses, vertical transfer pulses and horizontal transfer pulses, etc., and applies these signals to the CCD 2. The driver 4 generates the drain-gate pulses $\phi G$ and the drain pulses $\phi D$, etc., and applies these to the CCD 2.

When an imaging mode is set by the operating keys 8, the image of a subject is sensed by the CCD 2. As described above, the CCD 2 outputs a video signal by vertical one-half down sampling. The video signal is input to a CDS (correlated double sampling)/GCA (gain-controlled amplifier) circuit 21. The CDS/GCA circuit 21 executes correlated double sampling and gain control processing. The video signal that is output from the CDS/GCA circuit 21 is converted to digital image data in an AD (analog/digital) converter circuit 22.

The digital image data is subjected to predetermined signal processing such as a gamma correction and white balance adjustment in a signal processing circuit 23. Image data that is output from the signal processing circuit 23 is applied to a display unit 24, whereby the captured image of the subject is displayed on a display screen.

Signal charge that has been swept out from the sweep-out drain 17 of the CCD 2 in vertical one-half downsampling readout in the manner described above is applied to a current detector circuit 5, where the current component is detected. (The signal charge is not only smear charge but also includes signal charge that has accumulated in the photodiodes 11 to be downsampled. However, the signal charge may be smear charge only.) The detected current is applied to an integrating circuit 6, which integrates an amount of current equivalent to the signal charge that accumulated in the photodiodes 11 of all lines to be downsampled in the entire CCD 2. A signal representing the integrated value is input to the CPU 10.

The CPU 10 calculates the amount of exposure of the CCD 2 from the signal representing the integrated value and decides the shutter speed. The timing pulse generating circuit 7 and driver 3 are controlled in such a manner that the decided shutter speed is obtained.

If the shutter-release button is pressed, the image of the subject is sensed at the shutter speed that has been decided. The CCD 2 outputs signal charge, which has accumulated in the photodiodes 11 of all lines of the CCD 2, as a video signal. Since signal charge that has accumulated in the photodiodes 11 of all lines is output as a video signal, a video signal representing a high-quality image is output. This video signal is applied to the AD converter circuit 22 via the CDS/GCA circuit 21 and is converted to digital image data, as mentioned above.

The signal processing circuit 23 subjects the digital image data to predetermined signal processing by the signal processing circuit 23, as mentioned above. The image data output from the signal processing circuit 23 is applied to and recorded on a memory card 15.

When amount of exposure is calculated based upon signal charge obtained by downsampling in the vertical direction, image data corresponding to the video signal output from the CCD 2 can be applied to the display unit 24. The image of the subject can be displayed on the display screen of the display unit 24 beforehand even when the amount of exposure is calculated. Moreover, since image data that is based upon the video signal obtained from signal charge that has accumulated in all photodiodes 11 of the CCD 2 can be recorded on the memory card 15, the image represented by the image data recorded on the memory card 15 is of high image quality.

Figure 8:
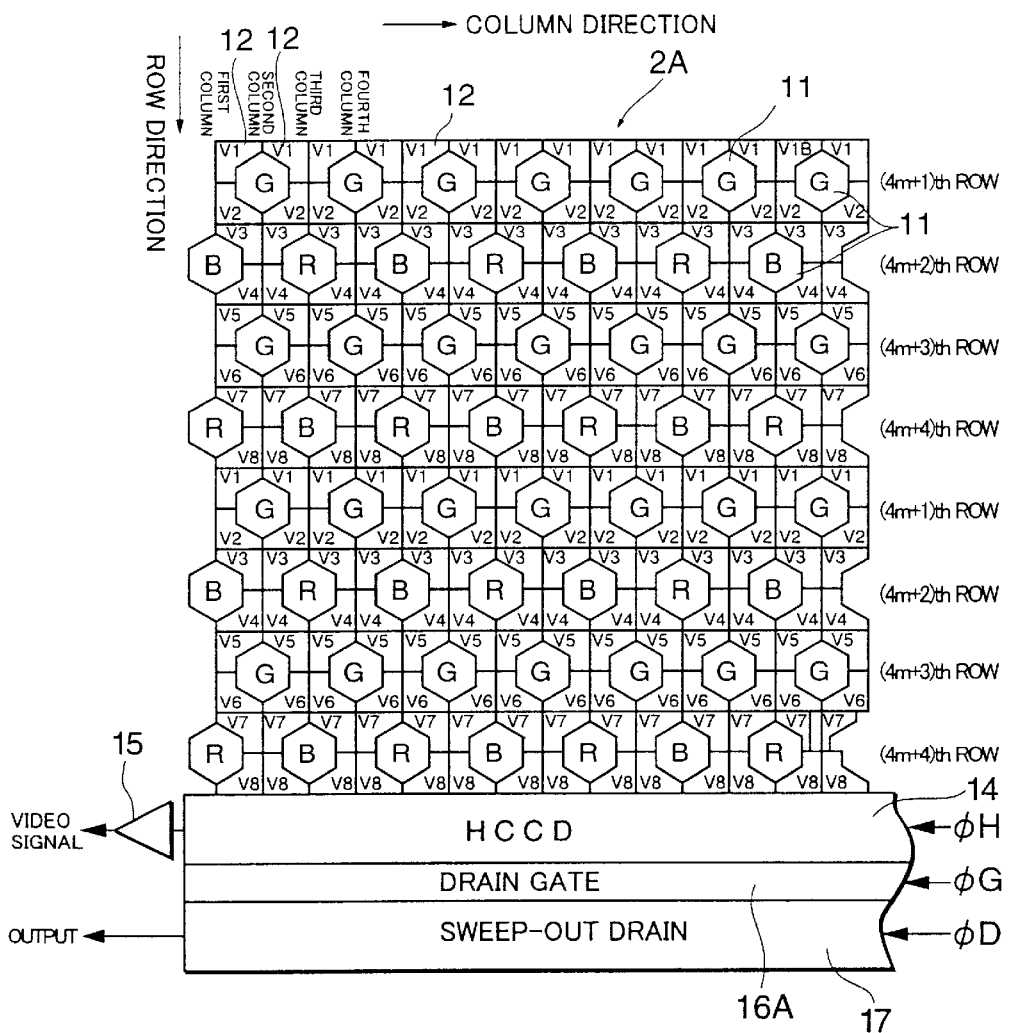
FIG. 8 is a diagram showing part of the structure of the photoreceptor surface of a CCD according to a second embodiment of the present invention.

FIG. 8 illustrates part of the structure of the photoreceptor surface of a CCD 2A according to a second embodiment of the present invention. Components in FIG. 8 identical with those shown in FIG. 1 are designated by like reference characters and need not be described again.

An R-color filter having a characteristic that transmits a red color component, a B-color filter having a characteristic that transmits a blue color component and a G-color filter having a characteristic that transmits a green color component are formed on the photoreceptor areas of the photodiodes 11 of the CCD 2A. The character "R" is attached to photodiodes 11 on which the R-color filters are formed, the character "B" is attached to photodiodes 11 on which the B-color filters are formed, and the character "G" is attached to photodiodes 11 on which the G-color filters are formed. The G-color filters are formed on the photoreceptor areas of photodiodes 11 in even-numbered columns, and the R- and B-color filters are formed alternately on the photoreceptor areas of photodiodes 11 in odd-numbered columns in such a manner that the sequence of the R- and B-color filters of a (4m+2)th row differs from that of the R- and B-color filters of a (4m+4)th row.

Further, a drain gate 16A for transferring signal charge to the sweep-out drain 17 is not formed in correspondence with all horizontal transfer electrodes of the horizontal transfer line 14 but rather is formed in correspondence with every predetermined number of horizontal transfer electrodes, as will be described in detail later.

FIGS. 9A to 9D and FIGS. 10A to 10D illustrate the manner in which red, blue and green signal charge of the image of a subject obtained by imaging is transferred. In FIGS. 9A to 10D, the "R" characters indicate signal charge of color red, the B" characters indicate signal charge of color blue, and the G" characters indicate signal charge of color green. According to this embodiment, signal charge of the red component, signal charge of the blue component and signal charge of the green component can each be output from the sweep-out drain 17.

Figure 9A:
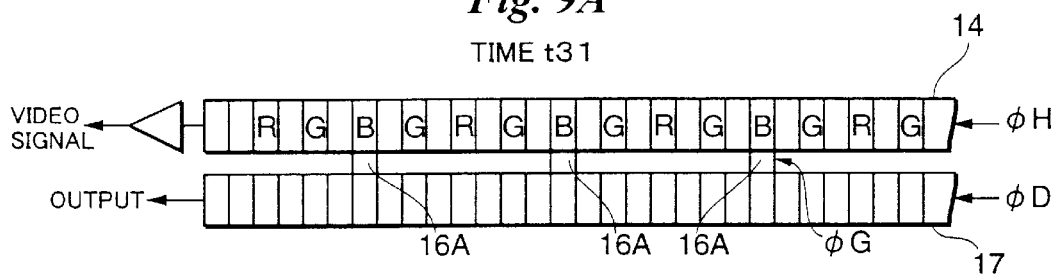
FIGS. 9A to 9D illustrate the manner in which signal charge is transferred according to the second embodiment.

In a manner similar to that set forth above, it will be assumed that signal charge that has accumulated in photodiodes 11 has already been swept out to the horizontal transfer line 14 at a time t31, as illustrated in FIG. 9A.

The drain gate 16A is formed every three pixels. The drain gates 16A are provided in correspondence with horizontal transfer electrodes formed on portions where signal charge of the color blue accumulates when signal charge that has accumulated in the photodiodes 11 of the (4m+3)th and (4m+4)th rows is input to the horizontal transfer line 14.

Figure 9B:
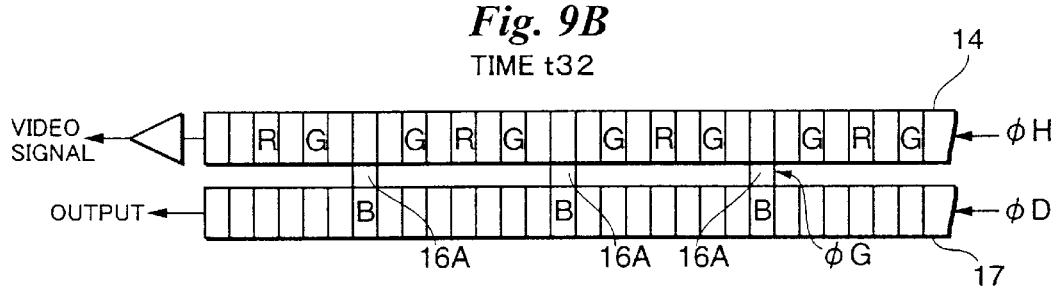

As shown in FIG. 9B, a drain-gate pulse $\phi G$ is applied to the drain gates 16A at time t32, whereupon the blue signal charge that has accumulated in the horizontal transfer line 14 is input to the sweep-out drain 17. One line of blue signal charge is output from the sweep-out drain 17 by applying a drain pulse φD to the sweep-out drain 17.

Figure 9C:
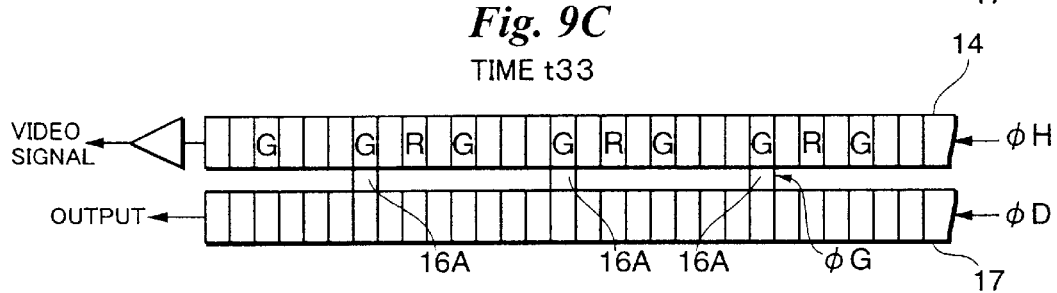
Figure 9D:
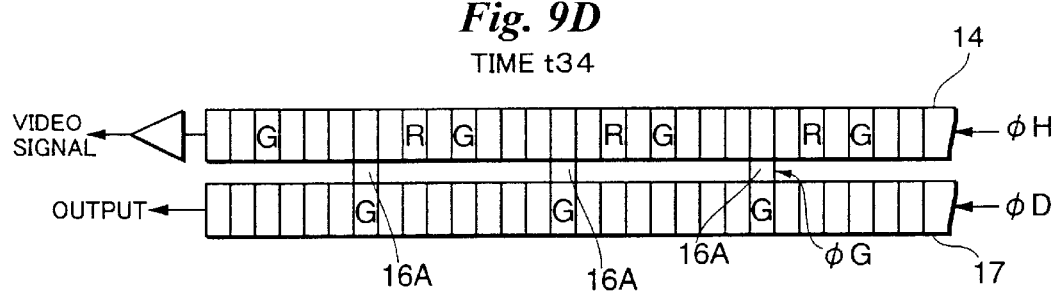

Signal charge of the colors red and green that has been stored in the horizontal transfer line 14 is transferred in the horizontal direction in an amount equivalent to one pixel by applying a horizontal transfer pulse φH to the horizontal transfer line 14. As a result, signal charge of the color green obtained from the photodiodes 11 of a 4n-th column (where n is a natural number) accumulates in the portions below the horizontal transfer electrodes corresponding to the drain gates 16A, as shown in FIG. 9C. When a drain-gate pulse φG is applied to the drain gates 16A at time t32, green signal charge is transferred to the horizontal transfer line 14 at time t34, as illustrated in FIG. 9D. The green signal charge is swept out from the sweep-out drain 17 by applying a drain-gate pulse φD to the sweep-out drain 17.

Figure 10A:
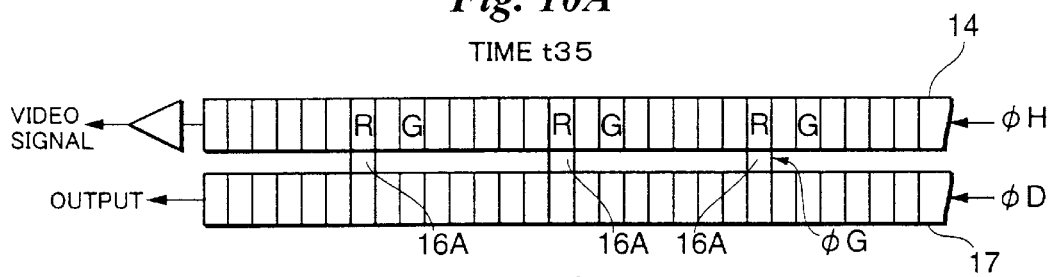
FIGS. 10A to 10D illustrate the manner in which signal charge is transferred according to the second embodiment.
Figure 10B:
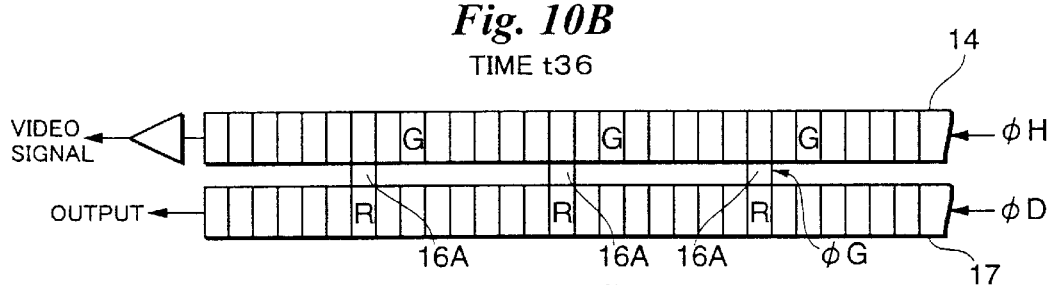

Signal charge of the colors red and green that has been stored in the horizontal transfer line 14 is transferred in the horizontal direction in an amount equivalent to one pixel by applying a horizontal transfer pulse φH to the horizontal transfer line 14. As a result, signal charge of the color red accumulates in the portions below the horizontal transfer electrodes corresponding to the drain gates 16A, as shown in FIG. 10A. When a drain-gate pulse φG is applied to the drain gates 16A at time t35, red signal charge is transferred to the horizontal transfer line 14 at time t36, as illustrated in FIG. 10B. The red signal charge is swept out from the sweep-out drain 17 by applying a drain-gate pulse φD to the sweep-out drain 17.

Figure 10C:
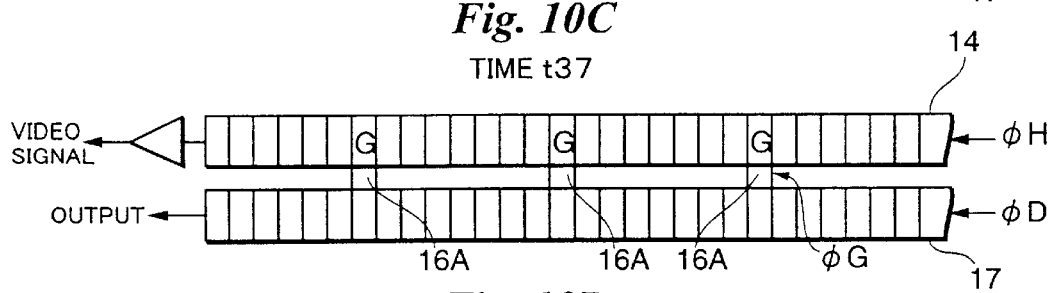
Figure 10D:
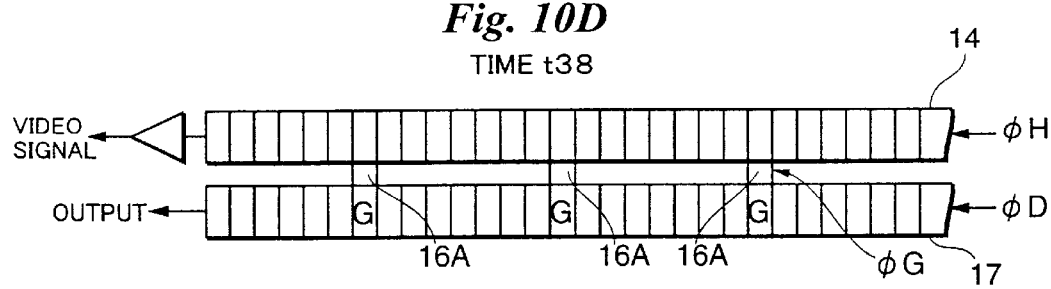

Similarly, green signal charge is input to the sweep-out drain 17 from the horizontal transfer line 14 and is swept out from the sweep-out drain 17 (see FIGS. 10C and 10D).

Figure 11:
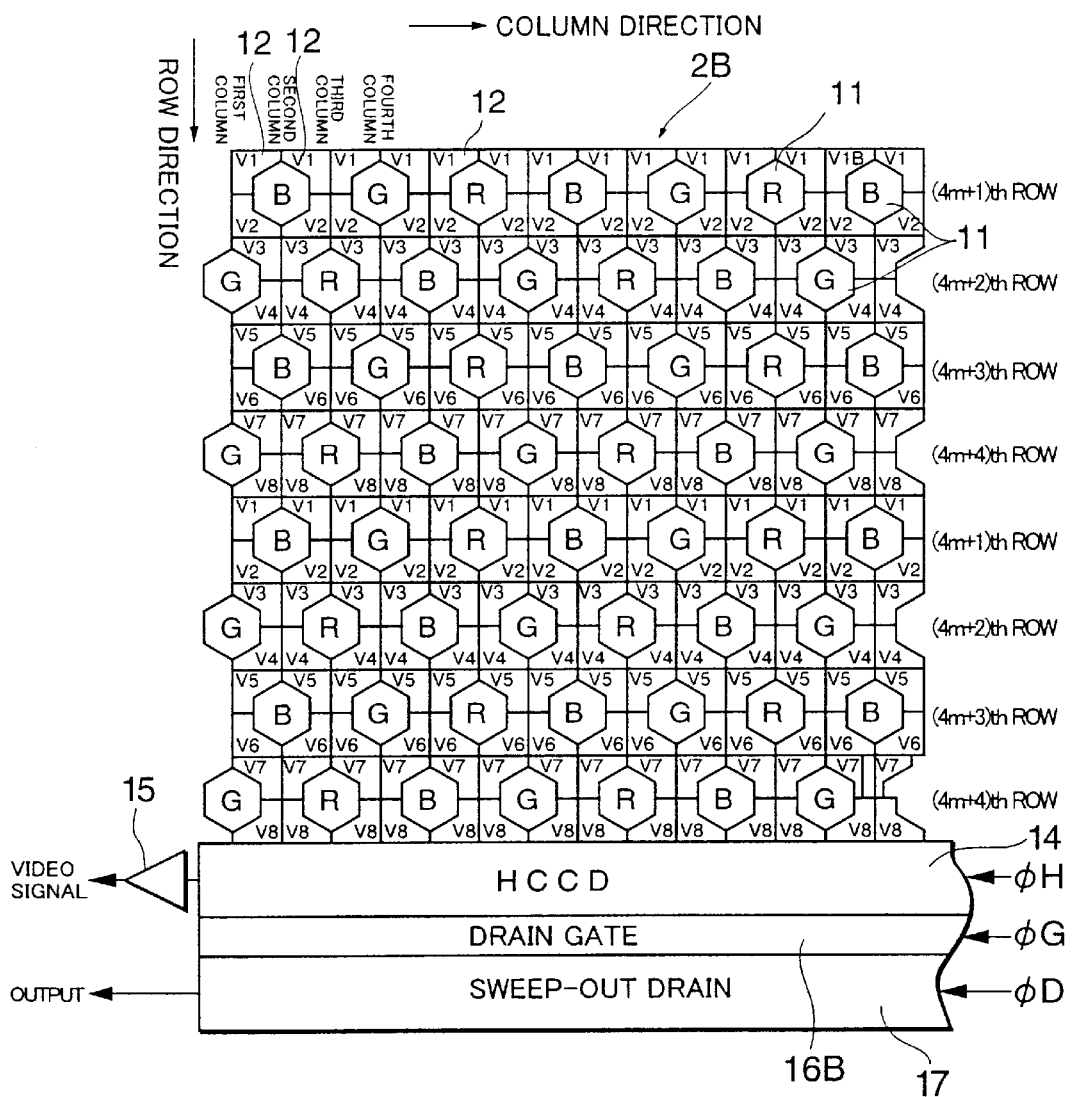
FIG. 11 is a diagram showing part of the structure of the photoreceptor surface of a CCD according to a third embodiment of the present invention.

FIG. 11 is a diagram showing part of the structure of the photoreceptor surface of a CCD 2B according to a third embodiment of the present invention. The array of color filters in FIG. 11 differs from that shown in FIG. 8. Components in FIG. 11 identical with those shown in FIG. 1 are designated by like reference characters and need not be described again.

In the CCD 2B shown in FIG. 11, G-color filters are formed on photodiodes 11 in a (3p+1)th column (where p is a natural number or 0), B-color filters are formed on photodiodes 11 in a (3p+2)th column, and R-color filters are formed on photodiodes 11 in a (3p+3)th column.

Figure 12A:
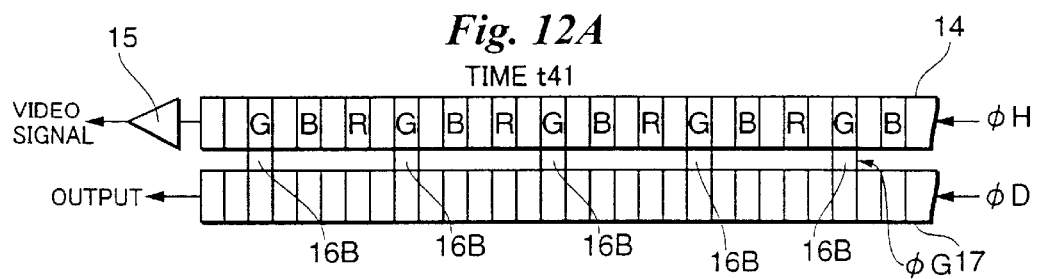
FIGS. 12A to 12F illustrate the manner in which signal charge is transferred according to the third embodiment.

In a manner similar to that described above, it will be assumed that signal charge that has accumulated in photodiodes 11 has already been swept out to the horizontal transfer line 14 at a time t41, as shown in FIG. 12A.

Further, a drain gate 16B is provided every two pixels. The drain gates 16B are provided in correspondence with horizontal transfer electrodes formed on portions where signal charge of the color green accumulates when signal charge that has accumulated in the photodiodes 11 of the (4m+3)th and (4m+4)th rows is input to the horizontal transfer line 14.

Figure 12B:
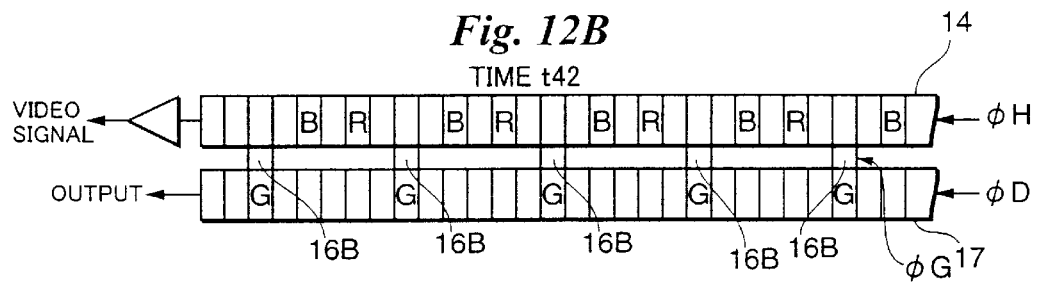

As shown in FIG. 12B, a drain-gate pulse φG is applied to the drain gates 16B at time t42, whereupon the green signal charge is input to the sweep-out drain 17. The green signal charge is swept out from the sweep-out drain 17 by applying a drain pulse φD to the sweep-out drain 17.

Figure 12C:
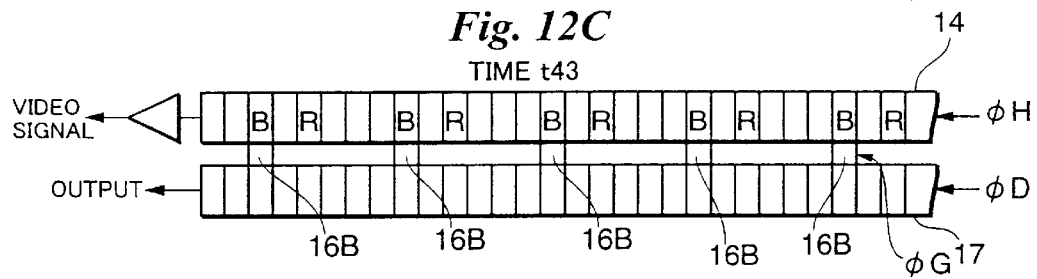
Figure 12D:
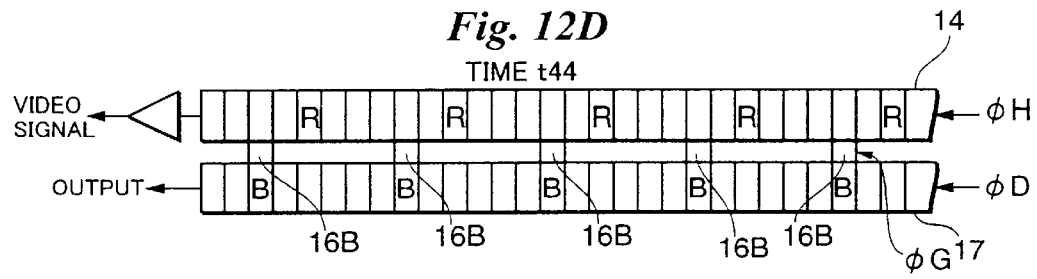

As shown in FIG. 12C, blue signal charge and red signal charge that remains in the horizontal transfer line 14 is transferred in the horizontal direction in an amount equivalent to one pixel by applying a horizontal transfer pulse φH to the horizontal transfer line 14 at time t43. As shown in FIG. 12D, blue signal charge is transferred to the sweep-out drain 17 by applying a drain-gate pulse φG to the drain gates 16B. The blue signal charge is swept out from the sweep-out drain 17 by applying a drain-gate pulse φD to the sweep-out drain 17.

Figure 12E:
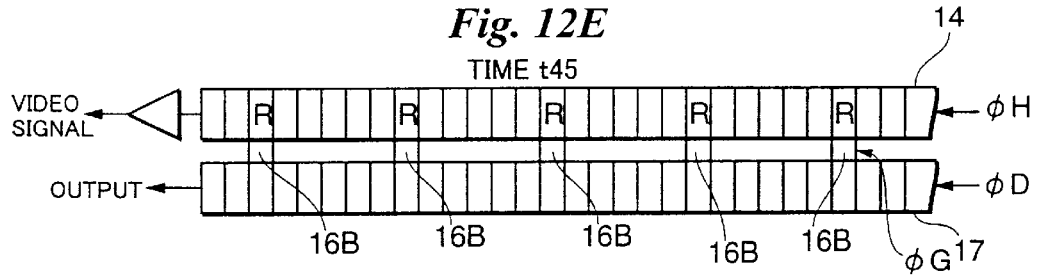
Figure 12F:
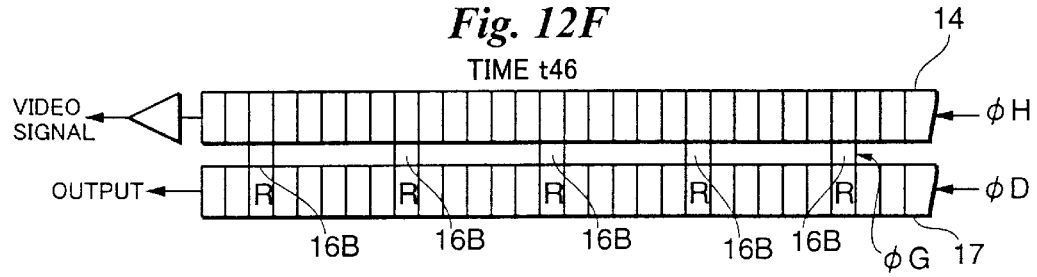

As shown in FIG. 12E, red signal charge that remains in the horizontal transfer line 14 is transferred in the horizontal direction in an amount equivalent to one pixel by applying a horizontal transfer pulse φH to the horizontal transfer line 14 at time t45. As shown in FIG. 12F, the red signal charge is transferred to the sweep-out drain 17 by applying a drain-gate pulse φG to the drain gates 16B at time t46. The red signal charge is output from the sweep-out drain 17 by applying a drain pulse φD to the sweep-out drain 17.

Thus, signal charge representing each of the color components can be output line by line.

As many apparently widely different embodiments of the present invention can be made without departing from the spirit and scope thereof, it is to be understood that the invention is not limited to the specific embodiments thereof except as defined in the appended claims.

What is claimed is:

1. A solid-state electronic image sensing device comprising:

a number of photoelectric transducers arrayed in vertical and horizontal directions;

vertical transfer lines, on which vertical transfer electrodes are formed in correspondence with said photoelectric transducers, for transferring signal charge, which has accumulated in said photoelectric transducers, in the vertical direction by application of vertical transfer pulses to the vertical transfer electrodes;

a horizontal transfer line for transferring in the horizontal direction and outputting signal charge that has been transferred from said vertical transfer lines;

a charge sweep-out drain for sweeping out signal charge input thereto; and a controller which, when vertical downsampling readout is performed, is for controlling said vertical transfer lines and said horizontal transfer line in such a manner that of signal charge that has accumulated in a plurality of rows of said photoelectric transducers, signal charge that has accumulated in at least one row of these photoelectric transducers is output from said horizontal transfer line, and controlling said vertical transfer lines and said horizontal transfer line in such a manner that smear charge, which is produced in vertical transfer lines between the vertical transfer electrodes corresponding to the photoelectric transducers of said one row, is applied to said charge sweep-out drain and is swept out from said charge sweep-out drain.

2. The device according to claim 1, wherein when vertical downsampling readout is performed, said controller controls said vertical transfer lines and said horizontal transfer line in such a manner that of signal charge that has accumulated in three or more rows of said photoelectric transducers, signal charge that has accumulated in at least one row of these photoelectric transducers is output from said horizontal transfer line, and controls said vertical transfer lines and said horizontal transfer line in such a manner that smear charge of a plurality of rows, which is produced in vertical transfer lines between said vertical transfer electrodes corresponding to the photoelectric transducers of said one row, is accumulated temporarily in said horizontal transfer line and the accumulated smear charge of the plurality of rows is swept out from said charge sweep-out drain.

3. An image sensing apparatus comprising:

an image sensing device for sensing the image of a subject, and outputting a video signal representing the image of the subject, using a solid-state electronic image sensing device having vertical transfer lines on which vertical transfer electrodes are formed in correspondence with a number of photoelectric transducers arrayed in vertical and horizontal directions, a horizontal transfer line for transferring in the horizontal direction and outputting signal charge that has been transferred from the vertical transfer lines, a charge sweep-out drain for sweeping out signal charge input thereto, and a device which, when vertical downsampling readout is performed, is for controlling the vertical transfer lines and the horizontal transfer line in such a manner that signal charge that has accumulated in at least one row of the photoelectric transducers among a plurality of rows thereof is output from the horizontal transfer line as a video signal, and in such a manner that signal charge that has accumulated in the photoelectric transducers of the one row is applied to the charge sweep-out drain and is swept out from the charge sweep-out drain;

an exposure controller for controlling exposure of the photoelectric transducers of the solid-state electronic image sensing device in accordance with an applied exposure control signal; and an exposure-amount calculator for calculating amount of exposure based upon signal charge that has been swept out from the charge sweep-out drain, generating the exposure control signal in such a manner that the amount of exposure becomes the calculated amount of exposure, and applying the exposure control signal to the exposure controller.

4. A solid-state electronic image sensing device comprising:

a number of photoelectric transducers arrayed in vertical and horizontal directions;

a color filter formed on each of said photoelectric transducers and having a characteristic that allows transmission of a red, blue or green color component;

vertical transfer lines for transferring signal charge, which has accumulated in said photoelectric transducers, in the vertical direction;

a horizontal transfer line for temporarily accumulating signal charge that has been transferred from said vertical transfer lines, and transferring the signal charge in the horizontal direction;

a charge sweep-out drain for sweeping out signal charge input thereto; and a transfer gate for transferring the signal charge, which has accumulated temporarily in said horizontal transfer line, from said horizontal transfer line to the charge sweep-out drain on a per-red-color-, blue-color- or green-color-component basis.

5. A method of controlling a solid-state electronic image sensing device having a number of photoelectric transducers arrayed in vertical and horizontal directions, vertical transfer lines, on which vertical transfer electrodes are formed in correspondence with said photoelectric transducers, for transferring signal charge, which has accumulated in said photoelectric transducers, in the vertical direction by application of vertical transfer pulses to the vertical transfer electrodes, and a horizontal transfer line for transferring in the horizontal direction and outputting signal charge that has been transferred from said vertical transfer lines, said method comprising the steps of:

providing a charge sweep-out drain for sweeping out signal charge input thereto; and when vertical downsampling readout is performed, controlling the vertical transfer lines and the horizontal transfer line in such a manner that of signal charge that has accumulated in a plurality of rows of the photoelectric transducers, signal charge that has accumulated in at least one row of these photoelectric transducers is output from the horizontal transfer line, and controlling the vertical transfer lines and the horizontal transfer line in such a manner that smear charge, which is produced in vertical transfer lines between the vertical transfer electrodes corresponding to the photoelectric transducer of the one row, is applied to the charge sweep-out drain and is swept out from the charge sweep-out drain.

6. A method of controlling an image sensing apparatus, comprising the steps of:

obtaining a video signal representing the image of a subject by sensing the image of the subject using a solid-state electronic image sensing device having vertical transfer lines on which vertical transfer electrodes are formed in correspondence with a number of photoelectric transducers arrayed in vertical and horizontal directions, a horizontal transfer line for transferring in the horizontal direction and outputting signal charge that has been transferred from the vertical transfer lines, a charge sweep-out drain for sweeping out signal charge input thereto, and a unit which, when vertical downsampling readout is performed, is for controlling the vertical transfer lines and the horizontal transfer line in such a manner that signal charge that has accumulated in at least one row of the photoelectric transducers among a plurality of rows thereof is output from the horizontal transfer line as a video signal, and in such a manner that signal charge that has accumulated in the photoelectric transducers of the one row is applied to the charge sweep-out drain and is swept out from the charge sweep-out drain;

calculating amount of exposure based upon signal charge that has been swept out from the charge sweep-out drain; and controlling exposure of the photoelectric transducers in such a manner that the amount of exposure becomes the calculated amount of exposure.

7. A method of controlling a solid-state electronic image sensing device having a number of photoelectric transducers arrayed in vertical and horizontal directions, a color filter formed on each of the photoelectric transducers and having a characteristic that allows transmission of a red, blue or green color component, vertical transfer lines for transferring signal charge, which has accumulated in the photoelectric transducers, in the vertical direction, and a horizontal transfer line for temporarily accumulating signal charge that has been transferred from the vertical transfer lines, and transferring the signal charge in the horizontal direction, the method comprising the steps of:

providing a charge sweep-out drain for sweeping out signal charge input thereto; and transferring the signal charge, which has accumulated temporarily in the horizontal transfer line, from the horizontal transfer line to the charge sweep-out drain on a per-red-color-, blue-color- or green-color-component basis.

* * * * *